United States Patent [19]

Raj

[11] Patent Number: 5,780,741
[45] Date of Patent: Jul. 14, 1998

[54] SENSOR EMPLOYING A SLIDING MAGNET SUSPENDED ON FERROFLUID

[75] Inventor: Kuldip Raj, Merrimack, N.H.

[73] Assignee: Ferrofluidics Corporation, Nashua, N.H.

[21] Appl. No.: 799,121

[22] Filed: Feb. 11, 1997

[51] Int. Cl.$^6$ ........................................ G01P 15/08
[52] U.S. Cl. ........................... 73/514.08; 73/514.31; 33/366
[58] Field of Search ............ 73/514.06, 514.08–514.26, 73/514.31; 33/365, 366

[56] References Cited

U.S. PATENT DOCUMENTS

| | | | |
|---|---|---|---|
| 4,667,414 | 5/1987 | Russell | 33/364 |
| 4,706,498 | 11/1987 | Nemnich et al. | 73/514.08 |
| 4,922,753 | 5/1990 | Idogaki et al. | 73/514.08 |
| 5,452,520 | 9/1995 | Raj et al. | 33/366 |

*Primary Examiner*—Michael Brock
*Attorney, Agent, or Firm*—Kudirka & Jobse, LLP

[57] ABSTRACT

A ferrofluid sensor assembly includes a permanent magnet which is supported in a hermetically-sealed housing by ferrofluid rings at each end of the magnet. However, the housing is large enough that the ferrofluid rings do not seal the end of the magnet against the walls of the housing. The housing is filled with a non-magnetic liquid that is immiscible with the ferrofluid. The nonmagnetic liquid wets the walls of the housing such that the ferrofluid rides on the thin film of the nonmagnetic liquid. The non-magnetic fluid is selected to have low viscosity, so that the magnet has a fast response time.

20 Claims, 2 Drawing Sheets

5,780,741

SENSOR EMPLOYING A SLIDING MAGNET SUSPENDED ON FERROFLUID

FIELD OF THE INVENTION

This invention relates to a ferrofluid sensor subassembly that can be employed for detection and measurement of vibrations, acceleration and tilt.

BACKGROUND OF THE INVENTION

Sensors, or transducers, may be used to detect and measure a variety of conditions including vibrations, acceleration and tilt. Sensor subassemblies are available in a variety of forms including mechanical, electrical and ferrofluidic. Mechanical vibration and acceleration sensors use pendulums or moving elements. Electrical sensors use mercury slugs or cantilever beams to make or break an electrical contact. In a mercury-based sensor, the mercury is sealed in a glass vessel. Because of a high surface tension, the mercury does not stick to the glass vessel, but responds quickly to slight vibrations. However, mercury has the disadvantage of being a hazardous material.

One type of prior art ferrofluidic sensor subassembly consists of an axially polarized permanent magnet located in a non-magnetic housing completely filled with ferrofluid as illustrated in FIG. 1 and discussed in detail in U.S. Pat. No. 4,667,414. Ferrofluid 1 is a colloidal mixture of magnetic particles suspended in a liquid carrier, such as oil. The particles are coated with a surfactant such that the carrier wets the particles and maintains them in suspension. Ferrofluid 1 is sealed inside the non-magnetic housing 2 which includes a mechanism that allows the ferrofluid to expand (not shown in FIG. 1). For example, housing 2 may incorporate flexible diaphragms. Magnet 3 is free to move inside housing 2 and is suspended in the housing 2 by the ferrofluid 1 which becomes trapped in the magnetic field produced by the magnet 3.

The movement of magnet 3 can be detected by inductive coils (not shown) wound around housing 2 or by a Hall element (not shown). With the appropriate electronic signal processing, the inclination or acceleration of magnet 3 can be measured.

While such a device is relatively simple and works well in many circumstances, the ferrofluid 1 is generally fairly viscous due to the presence of the oil carrier. The viscosity of the ferrofluid 1 produces a viscous drag on the magnet 3 and thus slows response time of the device. Since the ferrofluid viscosity is a function of temperature, the response time is temperature dependent. Furthermore, a small increase in the mass of the magnet 3 occurs over time due to sedimentation of ferrofluid particles on the magnet surface. This affects the calibration of the device.

In order to overcome these problems, the configuration illustrated in FIG. 2 is often used. This configuration is described in detail in U.S. Pat. No. 5,452,520. The magnet 3 in this device is centered in a housing or tube 2 by two ferrofluid rings 1,4 situated on either end of the magnet 3 and held by the magnetic field. There is no physical contact between the magnet 3 and the housing 2. The magnet 3 can slide freely because the ferrofluid rings 1,4 act as frictionless bearings inside the housing 2. The ferrofluid rings 1,4 also form low pressure seals between the magnet 3 and the walls of the housing 2. Accordingly, the ends of the housing 2 generally have small openings 5,6 to release any pressure build-up of air due to the motion of the magnet 3.

This device does not have the response time and calibration problems discussed above. However, as the magnet 3 moves, it leaves behind a thin layer of ferrofluid adhering to the wall of the housing 2 due to surface tension. Eventually, the ferrofluid in the ferrofluid rings 1,4 becomes depleted and the levitation force produced by the ferrofluid is reduced. If the length of the housing 2 is relatively long so that the magnet 3 excursion is long or the magnet 3 movement is rapid, a significant amount of the ferrofluid may be lost from the ferrofluid rings 1,4 during each travel of the magnet 3 through the housing 2, thereby rapidly depleting the ferrofluid rings 1,4. When the rings 1,4 are sufficiently depleted, magnet 3 will no longer be suspended resulting in failure of the device. Additionally, over time, ferrofluid may be lost through the vent holes 5,6 in the housing resulting in a short product life.

It is therefore desirable to reduce the response time of ferrofluid sensors while extending their life.

SUMMARY OF THE INVENTION

A ferrofluid sensor assembly constructed in accordance with the principles of the present invention includes a permanent magnet which is supported in a hermetically-sealed housing by ferrofluid rings at each end of the magnet. However, the housing is large enough that the ferrofluid rings do not seal the end of the magnet against the walls of the housing. The housing walls are coated with a thin film of immiscible liquid on which the ferrofluid rides.

Because the housing is sealed, there are no evaporative losses of the ferrofluid. As the magnet moves, there is no residual film of ferrofluid left behind on the surface of the housing because the ferrofluid rides on the thin film of preferentially wetting liquid and does not wet the surface of the housing walls. The magnet is permanently suspended by the two ferrofluid rings and slides without friction and there is no degradation with time.

In accordance with one embodiment, the housing is filled with a non-magnetic liquid that is immiscible with the ferrofluid. The nonmagnetic liquid wets the walls of the housing and provides a surface such that the ferrofluid rides on the thin film of the nonmagnetic liquid. The non-magnetic fluid is selected to have low viscosity, so that the magnet has a much quicker response time than the prior art device which is filled with ferrofluid.

DETAILED DESCRIPTION OF PREFERRED EMBODIMENTS

Figure 1:
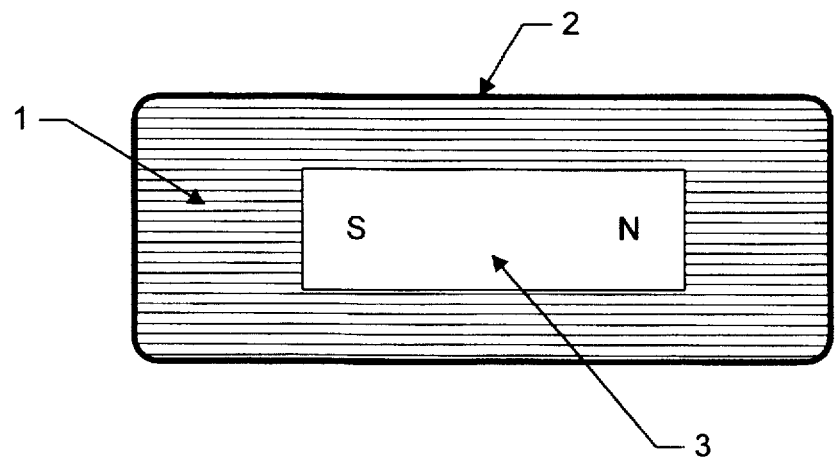
FIG. 1 is a schematic diagram of a prior art ferrofluid sensor subassembly which is completely filled with ferrofluid to suspend a sensor magnet.
Figure 2:
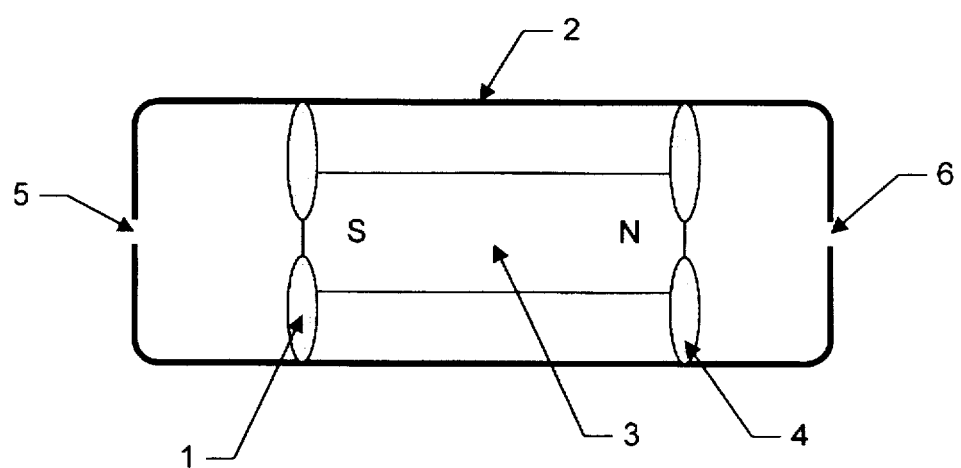
FIG. 2 is a schematic diagram of another prior art ferrofluid sensor subassembly which utilizes ferrofluid rings to suspend the sensor magnet.
Figure 3:
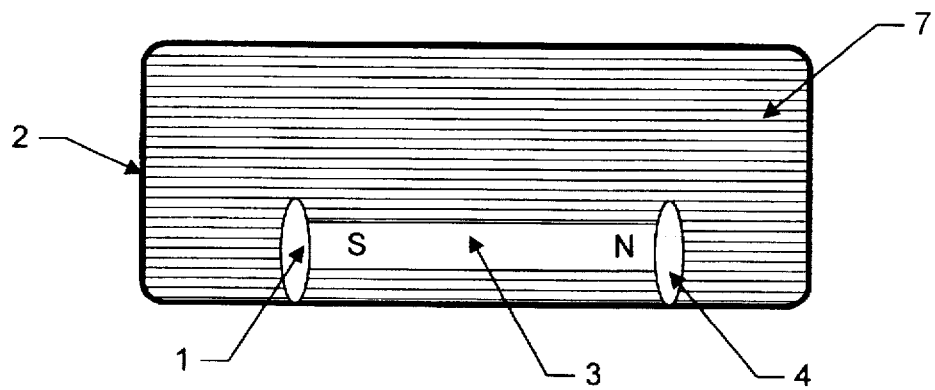
FIG. 3 is a schematic diagram of a ferrofluid sensor subassembly constructed in accordance with the principles of the present invention which utilizes ferrofluid rings to suspend the sensor magnet in a low viscosity fluid filled housing.

As shown in FIG. 3, a hermetically-sealed housing 2 encloses an axially-polarized permanent magnet 3 and a nonmagnetic liquid 7. Magnet 3 is supported in housing 2 by ferrofluid rings 1 and 4 at each end of the magnet and the levitation force produced by the ferrofluid. Rings 1,4 are held in place at the ends of magnet 3 by the magnetic field produced by magnet 3. However, housing 2 is large enough that the ferrofluid rings 1,4 do not seal the ends of magnet 3 against the walls of nonmagnetic housing 2, which may be made of glass or plastic. Therefore, as the magnet 3 moves the liquid 7 is free to move around the magnet 3.

Housing 2 is filled with a nonmagnetic fluid 7 that is immiscible with the ferrofluid in rings 1 and 4. The ferrofluid carrier liquid neither mixes with, nor chemically reacts with, the ferrofluid in the rings 1 and 4. Thus, the colloid stability and physical properties of ferrofluid remain unchanged when it is in contact with the liquid 7. The nonmagnetic liquid 7 preferentially wets the inner walls of the housing 2 such that the ferrofluid in rings 1 and 4, which would otherwise stick to the dry wall of the housing now rides on the thin film of the nonmagnetic liquid 7. Alternatively, another nonwetting film could be used on the inner walls of the housing. Such a material might, for example, comprise a film of TEFLON® or other suitable lubricant.

Many types of non-magnetic liquids can be used for liquid 7. Water is the preferred liquid, however, because of its high freezing point (0° C.), it is preferable to mix the water with any alcohol such as isopropanol which has a freezing point of −89.5° C. The temperature range of the sensor subassembly can thus be extended to lower temperatures. Water is immiscible with a typical ferrofluid carrier liquid. Such a carrier liquid might be a low molecular weight fluorocarbon liquid, which is chemically known as perfluoropolyether.

Because the housing 2 is sealed, there are no evaporative losses from the ferrofluid carrier. In addition, as the magnet 3 moves, there is no residual film of ferrofluid left behind on the surface of the housing 1 from the ferrofluid rings 1 and 4. The magnet 3 is permanently suspended by the two ferrofluid rings 1 and 4 and there is no degradation with time.

Figure 4:
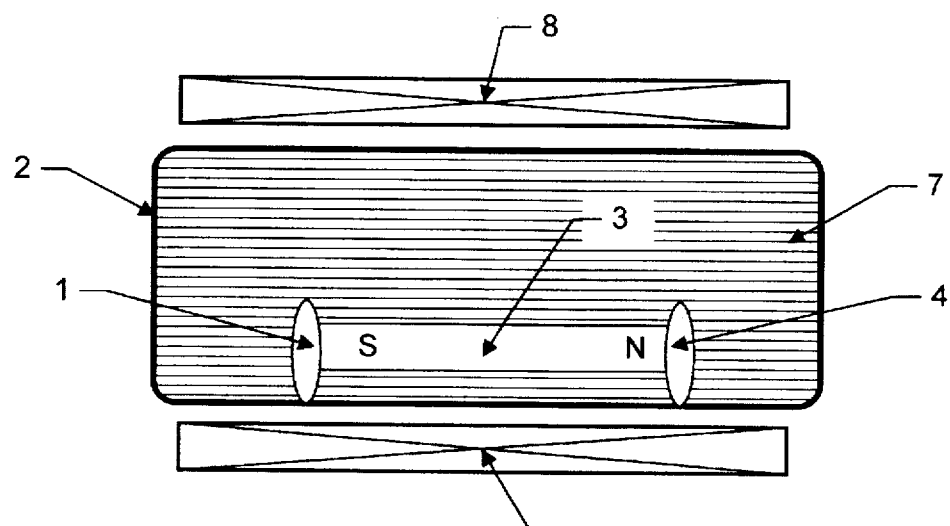
FIG. 4 is a schematic diagram of a ferrofluid sensor subassembly constructed in accordance with the principles of the present invention which illustrates sensing the position of the sensor magnet by inductive coils.

FIG. 4 illustrates a mechanism for sensing the position of the sensor magnet. The ferrofluid sensor assembly is constructed in accordance with the principles of the present invention in the same manner as shown in FIG. 3 and includes a permanent magnet 3 which is supported in a hermetically-sealed housing 2 by ferrofluid rings 1 and 4 at each end of the magnet 3. The housing 2 is filled with a non-magnetic liquid 7 that is immiscible with the ferrofluid in rings 1 and 4. FIG. 4 illustrates inductive coils 8 positioned around the housing 2 which sense the position of the sensor magnet 3. The position of the magnet in the sensor subassembly influences the inductance of coil 8 thereby generating an electrical signal which depends on the position of the magnet 3. Conventional electronic processing of this signal yields information about the vibrational level or inclination of the housing 2.

Figure 5:
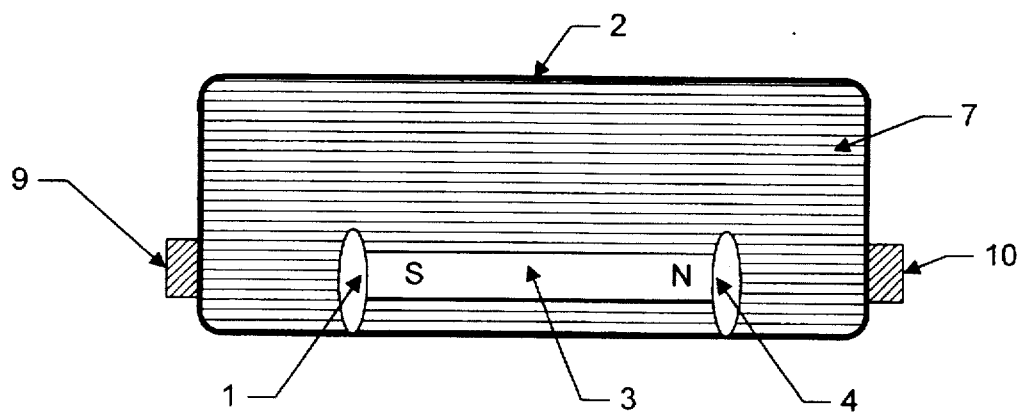
FIG. 5 is a schematic diagram of a ferrofluid sensor subassembly constructed in accordance with the principles of the present invention which illustrates sensing the position of the sensor magnet by Hall-effect devices.

FIG. 5 illustrates an embodiment in which the position of sensor magnet 3 is sensed by Hall-effect elements 9 and 10. These operate in a conventional manner to detect changes in the magnetic field generated by magnet 3 and thereby determine its position.

An actual subassembly was tested using a glass tube as housing 2 with a length of 40 mm, an outer diameter of 8 mm and an inner diameter of 6 mm. The housing tube 2 was closed at one end. The nonmagnetic liquid 7 was a 50/50 by volume mixture of deionized water and isopropanol. Magnet 3 consisted of an axially-polarized cylindrical Alnico 5 magnet with a length of 11 mm and a diameter of 2.5 mm.

The ferrofluid in rings 1 and 4 comprised a fluorocarbon-based ferrofluid with a magnetization of 325 gauss, and a viscosity less than 5 cp at 27° C.

The housing tube 2 was first rinsed with the 50/50 water isopropanol mixture 7 two times and then it was filled with the 50/50 water isopropanol mixture 7. The magnet 3 was cleaned with the mixture 7. The magnet 3 was cleaned with heptane and isopropanol to remove impurities and then placed inside the tube 2. About 25 microliters of ferrofluid was added to each pole of the magnet with a micro dispenser. The open end of the tube 2 was then sealed with a plug. A small air bubble was, however, left inside the tube 2 to allow for expansion of the mixture 7.

The aforementioned assembly was tested over a period of six months to determine if the ferrofluid colloid stability was affected by the immiscible mixture 7. The assembly was also monitored to determine if the ferrofluid and the mixture 7 intermixed over time. Further examinations were conducted to ascertain if the movement of the magnet left a thin film of ferrofluid on the wall of the tube. None of these problems were, however, found to occur in the assembly. The magnet was responsive to the vibrations at the end of the test period just the same way as it was on the first day of the test period.

This aforementioned assembly was also tested as a vibration sensor replacing a mercury-based sensor and was found to be a suitable replacement. The magnet in the assembly provides a high conductivity similar to the high conductivity of mercury and the levitation of the magnet on the ferrofluid rings in the presence of the low viscosity immiscible liquid provides a magnet movement similar to the low-friction movement of the mercury slug.

While the invention has been shown and described above with respect to various preferred embodiments, it will be apparent that the foregoing and other changes of the form and detail may be made therein by one skilled in the art without departing from the spirit and scope of the invention.

For example, although the housing and magnet have been described as having cylindrical shapes, these elements could have shapes with other cross-sections. These and other obvious modifications are intended to be covered by the following claims.

What is claimed is:

1. A ferrofluid sensor comprising:
   a hermetic housing having an inner wall with an inside dimension, the inner wall being coated with a material which is nonwetting with ferrofluid;
   a permanent magnet having a pole for generating a magnetic field, the magnet being movable within the housing;
   a ferrofluid ring located at the magnet pole, the ferrofluid ring being comprised of ferrofluid held in place by the magnetic field and having an outer dimension less than the inner wall inside dimension so that the ferrofluid ring does not seal the magnet pole to the housing; and
   a detector which detects a position of the magnet within the housing.

2. A ferrofluid sensor as recited in claim 1 wherein the housing is filled with a nonmagnetic liquid which is immiscible with the ferrofluid.

3. A ferrofluid sensor as recited in claim 2 wherein the nonwetting material comprises a layer of the liquid on the housing inner wall.

4. A ferrofluid sensor as recited in claim 2 wherein the ferrofluid is comprised of magnetic particles suspended in a carrier liquid with a viscosity and wherein the nonmagnetic liquid has a viscosity less than the viscosity of the ferrofluid.

5. A ferrofluid sensor as recited in claim 1 wherein the magnet has two poles and a ferrofluid ring is located at each of the two poles.

6. A ferrofluid sensor as recited in claim 1 wherein the magnet has a circular cross section.

7. A ferrofluid sensor as recited in claim 1 wherein the housing has a circular cross section.

8. A ferrofluid sensor as recited in claim 1 wherein the detector comprises at least one inductive coil surrounding the housing.

9. A ferrofluid sensor as recited in claim 1 wherein the detector comprises at least one Hall effect sensor.

10. A ferrofluid sensor as recited in claim 1 wherein the detector is optical.

11. A ferrofluid sensor comprising:

an hermetic housing having an inside dimension;

a permanent magnet having two ends and being movable within the housing for generating a magnetic field;

ferrofluid rings located at each magnet end, each of the ferrofluid rings being comprised of ferrofluid held in place by the magnetic field and having an outer dimension less than the housing inside dimension so that the ferrofluid rings do not seal the magnet ends to the housing;

a nonmagnetic liquid that is immiscible with the ferrofluid; and a detector to detect a position of the magnet within the housing.

12. A ferrofluid sensor as recited in claim 11 wherein the ferrofluid is comprised of magnetic particles suspended in a carrier liquid with a viscosity and wherein the nonmagnetic liquid has a viscosity substantially less than the viscosity of the ferrofluid.

13. A ferrofluid sensor as recited in claim 11 wherein the carrier liquid comprises a low molecular weight perfluoropolyether.

14. A ferrofluid sensor as recited in claim 11 wherein the magnet has a circular cross section.

15. A ferrofluid sensor as recited in claim 11 wherein the housing has a circular cross section.

16. A ferrofluid sensor as recited in claim 11 wherein the detector comprises at least one inductive coil surrounding the housing.

17. A ferrofluid sensor as recited in claim 11 wherein the detector comprises at least one hall effect sensor.

18. A ferrofluid sensor as recited in claim 11 wherein the detector comprises an optical detector.

19. A ferrofluid sensor as recited in claim 11 wherein the nonmagnetic liquid is a mixture of water and alcohol.

20. A ferrofluid sensor as recited in claim 11 wherein the housing is nonmagnetic.

\* \* \* \* \*